US009121992B2

(12) United States Patent
Hozono

(10) Patent No.: US 9,121,992 B2
(45) Date of Patent: Sep. 1, 2015

(54) IMAGE READING DEVICE, HOUSING OF CARRIAGE AND CARRIAGE

(71) Applicant: KYOCERA Document Solutions Inc., Osaka (JP)

(72) Inventor: Tomohide Hozono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/319,238

(22) Filed: Jun. 30, 2014

(65) Prior Publication Data

US 2015/0009545 A1   Jan. 8, 2015

(30) Foreign Application Priority Data

Jul. 8, 2013   (JP) ................. 2013-142279

(51) Int. Cl.
| | |
|---|---|
| *H04N 1/04* | (2006.01) |
| *G02B 7/02* | (2006.01) |
| *H04N 1/03* | (2006.01) |
| *H04N 1/024* | (2006.01) |

(52) U.S. Cl.
CPC ............. *G02B 7/02* (2013.01); *H04N 1/0249* (2013.01); *H04N 1/0305* (2013.01); *H04N 2201/0081* (2013.01); *H04N 2201/02458* (2013.01); *H04N 2201/02468* (2013.01); *H04N 2201/02477* (2013.01); *H04N 2201/02483* (2013.01)

(58) Field of Classification Search
CPC ...... G02B 27/225; G02B 27/26; G02B 27/28; G02B 27/646; G02B 3/005; G02B 3/0062; G02B 3/0068; H04N 5/272; H04N 5/33; H04N 5/335; H04N 5/347; H04N 5/355; H04N 5/361; H04N 5/37452
USPC .............. 382/103, 151, 284; 358/474; 399/45
See application file for complete search history.

(56) References Cited

U.S. PATENT DOCUMENTS

| | | | | |
|---|---|---|---|---|
| 4,700,237 | A | * | 10/1987 | Yoshioka et al. ............. 358/451 |
| 4,837,450 | A | * | 6/1989 | Satomura et al. ......... 250/559.02 |
| 5,150,259 | A | * | 9/1992 | Oishi ............................ 359/619 |
| 5,399,850 | A | * | 3/1995 | Nagatani et al. ........... 250/208.1 |
| 6,172,356 | B1 | * | 1/2001 | Ogura et al. ............. 250/227.11 |
| 6,359,704 | B1 | * | 3/2002 | Horaguchi .................... 358/474 |
| 7,598,478 | B2 | * | 10/2009 | Morimoto et al. ......... 250/208.1 |
| 8,488,214 | B2 | * | 7/2013 | Kaise ............................ 358/474 |
| 8,810,912 | B2 | * | 8/2014 | Shimmo et al. ............... 359/622 |
| 8,831,286 | B2 | * | 9/2014 | Li et al. ........................ 382/103 |
| 2010/0129116 | A1 | * | 5/2010 | Shinkawa ..................... 399/200 |
| 2013/0136306 | A1 | * | 5/2013 | Li et al. ........................ 382/103 |

FOREIGN PATENT DOCUMENTS

| | | |
|---|---|---|
| JP | 2004-271916 A | 9/2004 |
| JP | 2009-086594 A | 4/2009 |

* cited by examiner

*Primary Examiner* — Negussie Worku
(74) *Attorney, Agent, or Firm* — Studebaker & Brackett PC

(57) ABSTRACT

A development device includes an imaging lens and light shielding walls. The imaging lens includes a body part having a constant diameter and both end parts arranged at both ends in an optical axial direction having diameters larger than the body part to capture a reflected light from a document onto an imaging part. The light shielding walls has a space with an interval larger than the diameter of the body part and smaller than the diameters of the both end parts, allowing the body part of the imaging lens to be arranged in the space, and shielding a light in the optical axial direction.

7 Claims, 11 Drawing Sheets

IMAGE READING DEVICE, HOUSING OF CARRIAGE AND CARRIAGE

INCORPORATION BY REFERENCE

This application is based on and claims the benefit of priority from Japanese Patent application No. 2013-142279 filed on Jul. 8, 2013, the entire contents of which are incorporated herein by reference.

BACKGROUND

The present disclosure relates to an image reading device, a housing of a carriage and a carriage shielding an imaging part from a flare light.

An image reading device includes an optical scanning unit, such as a carriage, to irradiate a document by a light source, to reflect a reflected light from the document by a reflecting mirror and to make the reflected light incident on an imaging lens along an optical axial direction of the imaging lens. The imaging lens captures an incident light onto an imaging part, such as a charge coupled device (CCD). The imaging part picks up an image by photoelectrically converting the reflected light from the document captured by the imaging lens to generate image data.

For example, there is an image reading device configured so that the light source, reflecting mirror, imaging lens and imaging part are incorporated into a carriage in a body and the carriage is scanned to read the image of the document. Since such a carriage is generally manufactured to have tolerance, it is necessary to adjust the incorporation so as to appropriately capture the reflected light from the document onto the imaging part. Therefore, the imaging lens is fixed to a housing of the carriage by a pressuring member, such as a plate spring, after a position in the optical axial direction of the imaging lens is adjusted in order to appropriately adjust magnification.

For example, the reflected light from the document via the reflecting mirrors is varied in accordance with combination of the reflecting mirrors or an attached position. For instance, as shown in FIG. 9, the reflected light in a carriage 101 may become a light Lx forming the image on an imaging lens 102 at a position relatively farther from an imaging part 103 or a light Ly forming the image on the imaging lens 102 at another position relatively nearer to the imaging part 103. In a case where the former light Lx is generated, the imaging lens needs to be adjusted in a direction X separating from the imaging part 103. In another case where the latter light Ly is generated, the imaging lens needs to be adjusted in another direction Y approaching the imaging part 103.

However, in a configuration that the position of the imaging lens 102 can be adjusted, as shown in FIGS. 10 and 11, a gap in the periphery 104 of the imaging lens 102 is easily occurred. If a light Lz passing through (leaked out from) the gap without passing through the imaging lens 102 is incident to the imaging part 103, a received light quantity in the imaging part 103 is heightened at a place irradiated with such a unnecessary incident light Lz (a flare light) and appropriate image data of the document cannot be obtained. Therefore, in the image reading device, it is necessary to provide a configuration of shielding the imaging part 103 from the incident of the light not passing through the imaging lens.

For example, as the image reading device, there is an image reading unit including a light shielding member having a through hole between a lens and a CCD so that an internal shape of the through hole is determined smaller than an external shape of a barrel of the lens.

Moreover, as the image reading device, there is a configuration of providing a reception part formed in a U-shaped section or a V-shaped section in a housing in order to attach a cylinder like formed imaging lens. In this configuration, since a gap is occurred between the U-shaped or V-shaped reception part and imaging lens, it is necessary to close this gap and to shield the unnecessary light to the imaging part.

For example, as the image reading device, there is a configuration that a lens barrel is made of a difference cylinder like formed barrel having an incident side barrel part and a downstream side barrel part, a diameter of the incident side barrel part is smaller than a diameter of the downstream side barrel part, and the lens barrel is attached to a roughly semi-circular barrel installed part in a housing. In a rectangular case of a rear part of the housing, a pair of light shielding walls are formed to be vertically suspended downward from an upper end at a center part of a front face vertical wall and to connect to an end part of the barrel installed part at an lower end side. An interval between the light shielding walls is smaller than the diameter of the downstream side barrel part, and then, the light shielding walls are configured so as to shield a flare light run from the outside of the lens barrel to a CCD sensor.

However, in a configuration of capturing the light onto the imaging part via the through hole of the light shielding member by the imaging lens as the above-mentioned image reading unit, when the imaging lens is moved in the optical axial direction in order to adjust the magnification, the interval between the imaging lens and light shielding member is varied. Accordingly, there are possibilities that an optical path from the imaging lens to the imaging part cannot be appropriately secured and the light run from the periphery of the imaging lens to the imaging part cannot be appropriately shielded. Alternatively, it is necessary to provide a light shielding member moving together with the imaging lens during the magnification adjustment, and therefore, the structure may be complicated and manufacturing cost may be increased.

Moreover, since the recent imaging lens is miniaturized, if the barrel diameter in a leading end of the imaging lens is made smaller as the above-mentioned image reading device, the pressuring member hits on this leading end when the imaging lens is fixed to the housing, thereby destabilizing pressuring balance. Accordingly, there is a possibility that the position adjustment of the imaging lens becomes difficult. When the leading end with a small diameter in the imaging lens is lengthened, the pressuring member easily hits on the leading end. On the other hand, when the leading end in the imaging lens is shortened, the imaging lens comes off the light shielding walls, thereby becoming impossible to shield the flare light.

SUMMARY

In accordance with an embodiment of the present disclosure, an image reading device includes an imaging lens and light shielding walls. The imaging lens includes a body part having a constant diameter and both end parts arranged at both ends in an optical axial direction having diameters larger than the body part to capture a reflected light from a document onto an imaging part. The light shielding walls has a space with an interval larger than the diameter of the body part and smaller than the diameters of the both end parts, allows the body part of the imaging lens to be arranged in the space, and shields a light in the optical axial direction.

In accordance with the embodiment of the present disclosure, a housing of a carriage includes light shielding walls and a reception part. The light shielding walls has a space with an interval larger than a diameter of a body part of a predetermined imaging lens and smaller than diameters of both end parts arranged at both ends in an optical axial direction of the imaging lens, allows the body part of the imaging lens to be arranged in the space, and shields a light in the optical axial direction. The reception part formed in a concave shape is continued over the optical axial direction to support the both end parts of the imaging lens.

In accordance with the embodiment of the present disclosure, a carriage includes an imaging lens and light shielding walls. The imaging lens includes a body part having a constant diameter and both end parts arranged at both ends in an optical axial direction having diameters larger than the body part to capture a reflected light from a document onto an imaging part. The light shielding walls has a space with an interval larger than the diameter of the body part and smaller than the diameters of the both end parts, allows the body part of the imaging lens to be arranged in the space, and shields a light in the optical axial direction.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
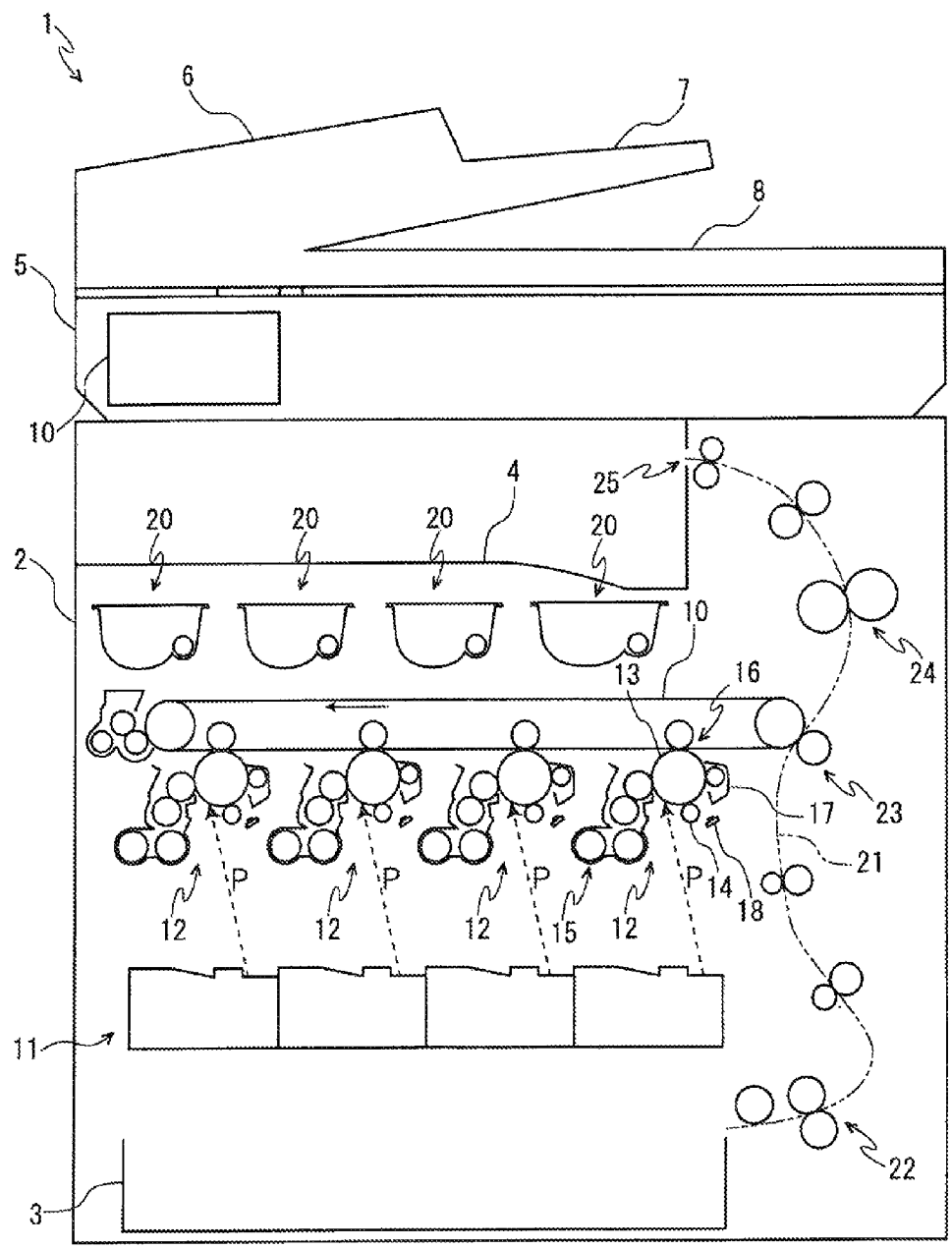
FIG. 1 is a sectional view schematically showing a structure of a multifunction peripheral according to an embodiment of the present disclosure.

First, the entire structure of a multifunction peripheral 1 (an image reading device) as an image forming apparatus will be described. FIG. 1 is a schematic diagram schematically showing a structure of a multifunction peripheral according to an embodiment of the present disclosure.

As shown in FIG. 1, the multifunction peripheral 1 includes a box-formed apparatus main body 2. In a lower part of the apparatus main body 2, a sheet feeding cartridge 3 storing sheets (not shown) is installed and, in an upper part of the apparatus main body 2, a first ejected sheet tray 4 is provided. The sheet feeding cartridge 3 and first ejected sheet tray 4 are used for conveying the sheet on which the image is formed by an image forming part in the apparatus main body 2.

Above the first ejected sheet tray 4 in the upper part of the apparatus main body 2, an image reading device reading appearance of a document as image data is arranged. Above the image reading device 5, a document feeding device 6 feeding the document to the image reading device 5 is arranged. In a top face of the document feeding device 6, a feeding sheet tray 7 is arranged and, below the feeding sheet tray 7, a second ejected sheet tray 8 is arranged. The feeding sheet tray 7 and second ejected sheet tray 8 are used for conveying the document on which the image is read by the image reading device 5. The details of the image reading device 5 will be described later.

In a center part of the apparatus main body 2, an intermediate transferring belt 10 is bridged over a plurality of rollers. Below the intermediate transferring belt 10, an exposure device 11 composed of a laser scanning unit (LSU) is installed. Near the intermediate transferring belt 10, four image forming parts 12 are installed for respective toner colors (for example, magenta, cyan, yellow and black) along a lower part of the intermediate transferring belt 10. In each image forming part 12, a photosensitive drum 13 is rotatably attached. Around the photosensitive drum 13, a charger 14, a development device 15, a first transferring part 16, a cleaning device 17 and a static eliminator 18 are located in a process order of the first transferring. Above the respective development devices 15, four toner containers 20 as toner cases respectively corresponding to the image forming parts 12 are installed for the toner colors.

At one side (the right-hand side of the figure) in the apparatus main body 2, a conveying path 21 of the sheet is positioned. At an upstream end of the conveying path 21, a sheet feeder 22 is positioned. At an intermediate stream part of the conveying path 21, a second transferring part 23 is positioned at one end (a right end of the figure) of the intermediate transferring belt 10. At a downstream part of the conveying path 21, a fixing device 24 is positioned. At a downstream end of the conveying path 21, an ejection opening 25 is positioned.

Figure 2:
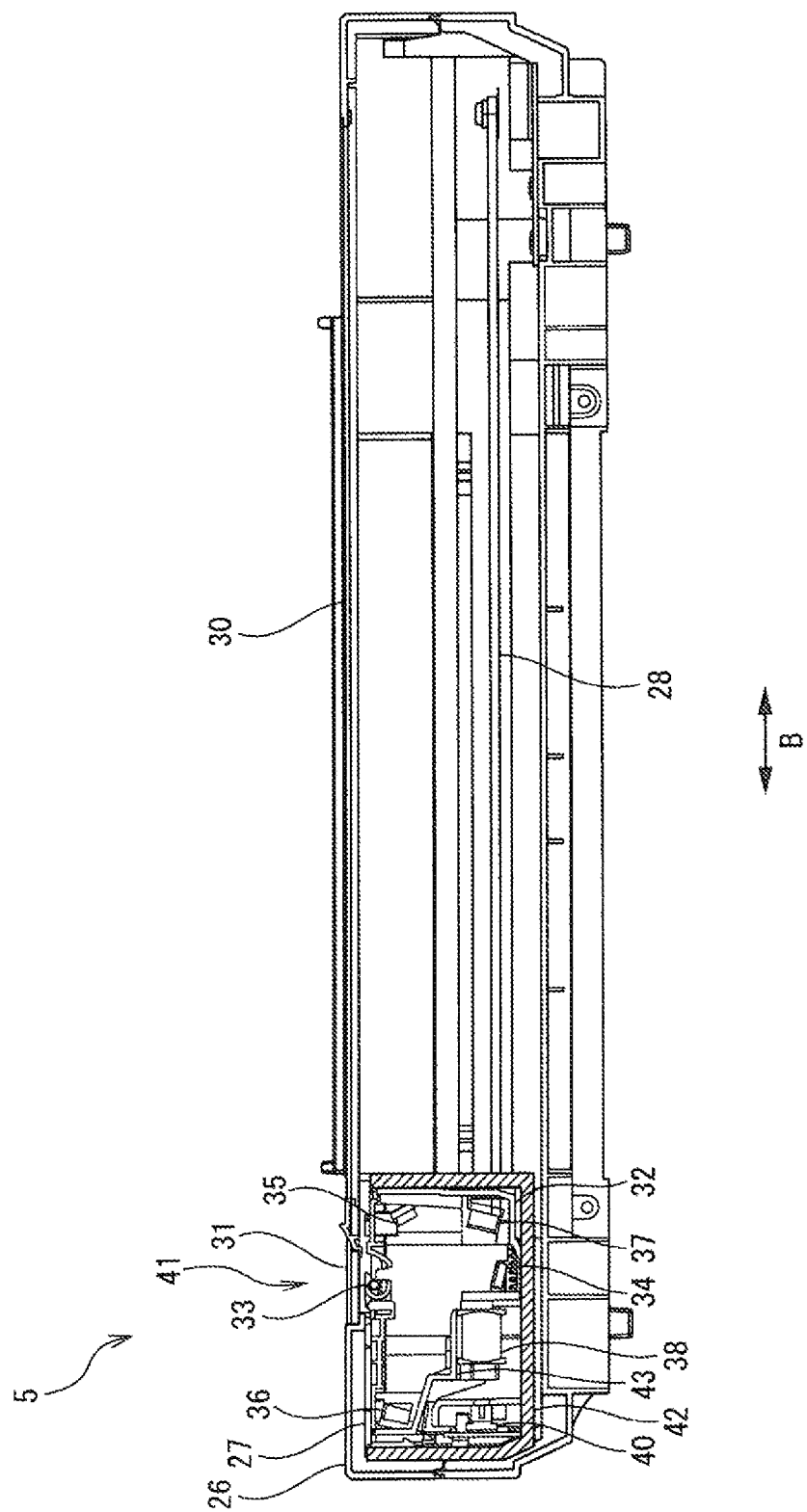
FIG. 2 is a sectional view schematically showing a structure of an image reading device according to the embodiment of the present disclosure.
Figure 3:
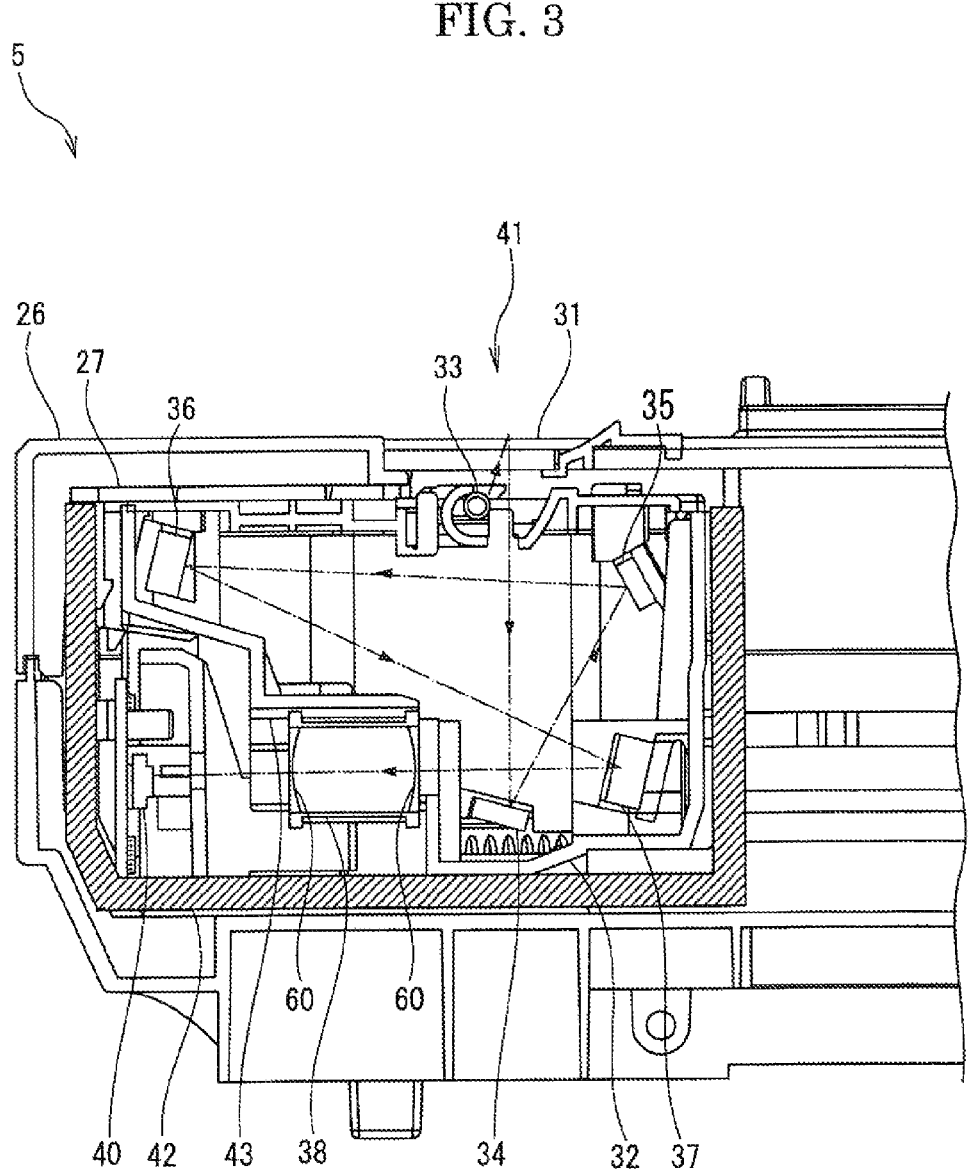
FIG. 3 is an enlarged view of principal parts in FIG. 2.
Figure 4:
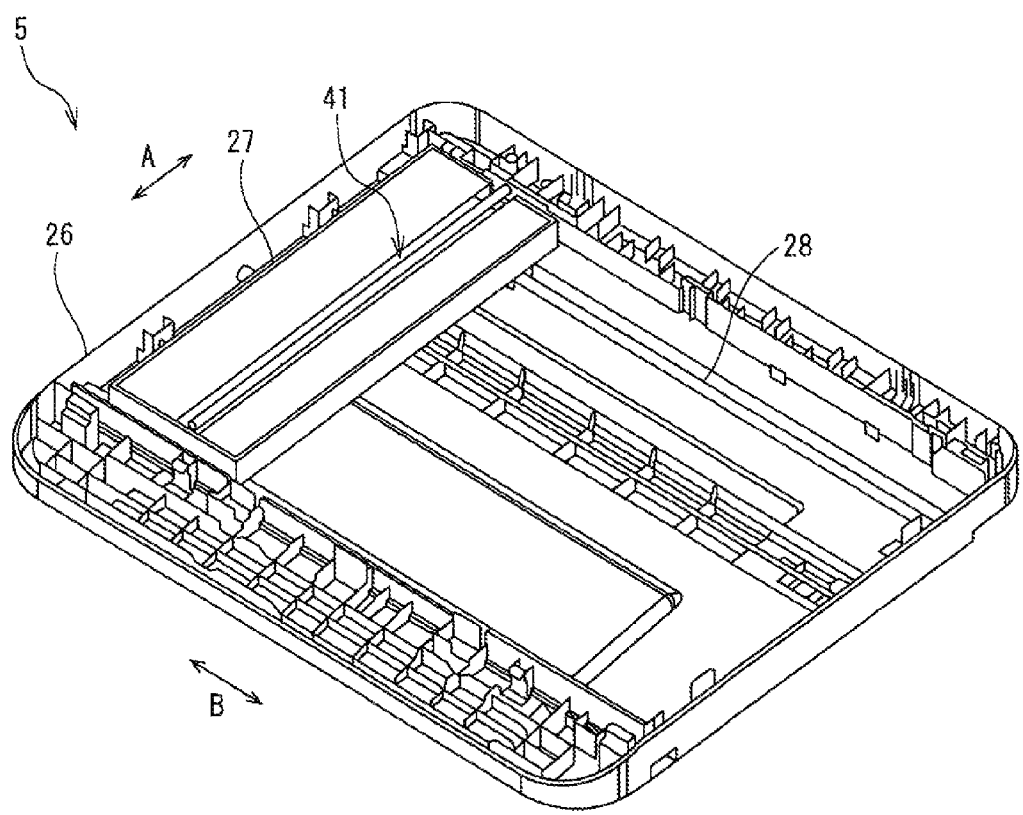
FIG. 4 is a perspective view of the image reading device in a situation where an upper part is opened according to the embodiment of the present disclosure.
Figure 5:
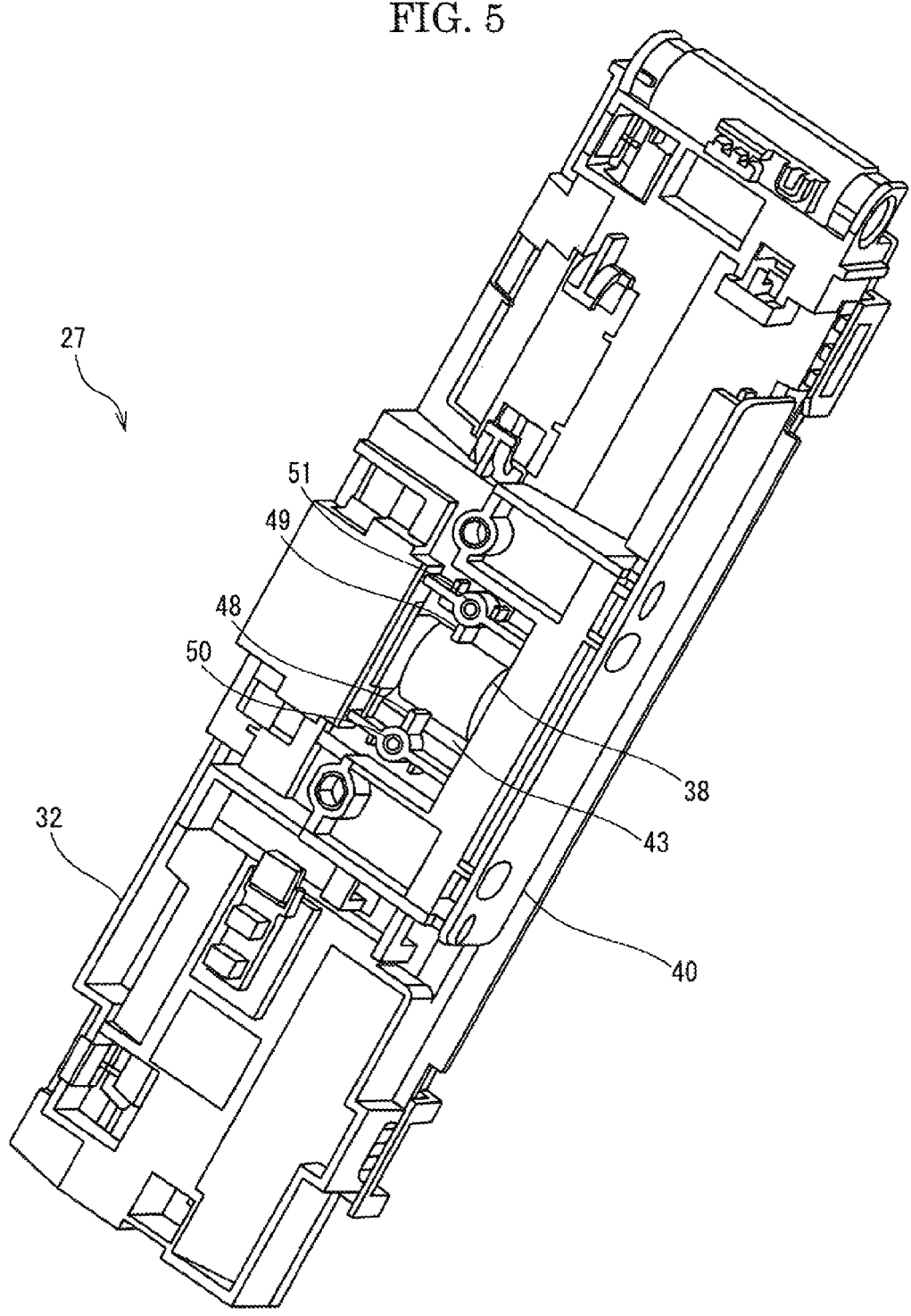
FIG. 5 is a lower perspective view of the image reading device in a situation where a lower side cover of a carriage is detached according to the embodiment of the present disclosure.
Figure 6:
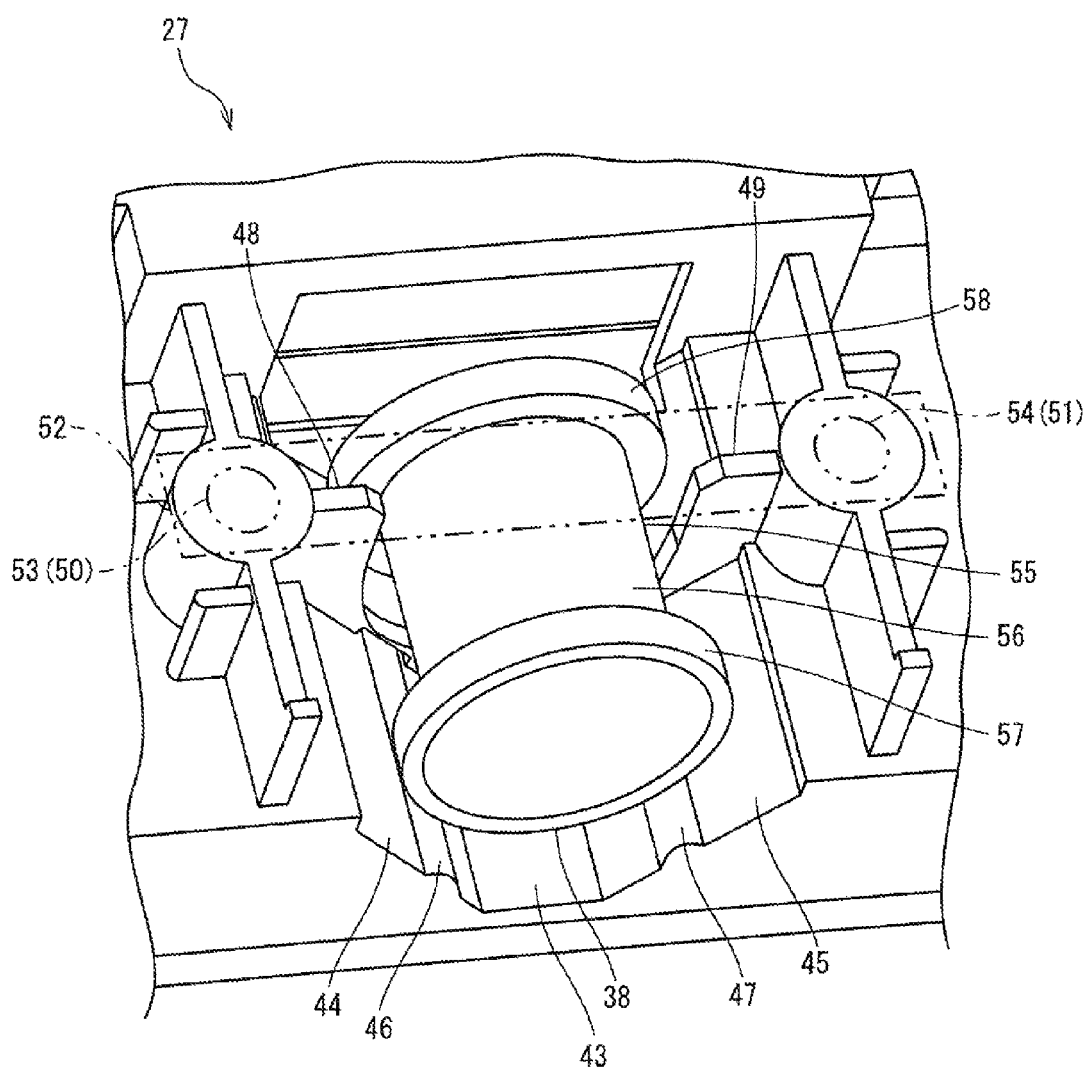
FIG. 6 is an enlarged view of principal parts in FIG. 5.
Figure 7:
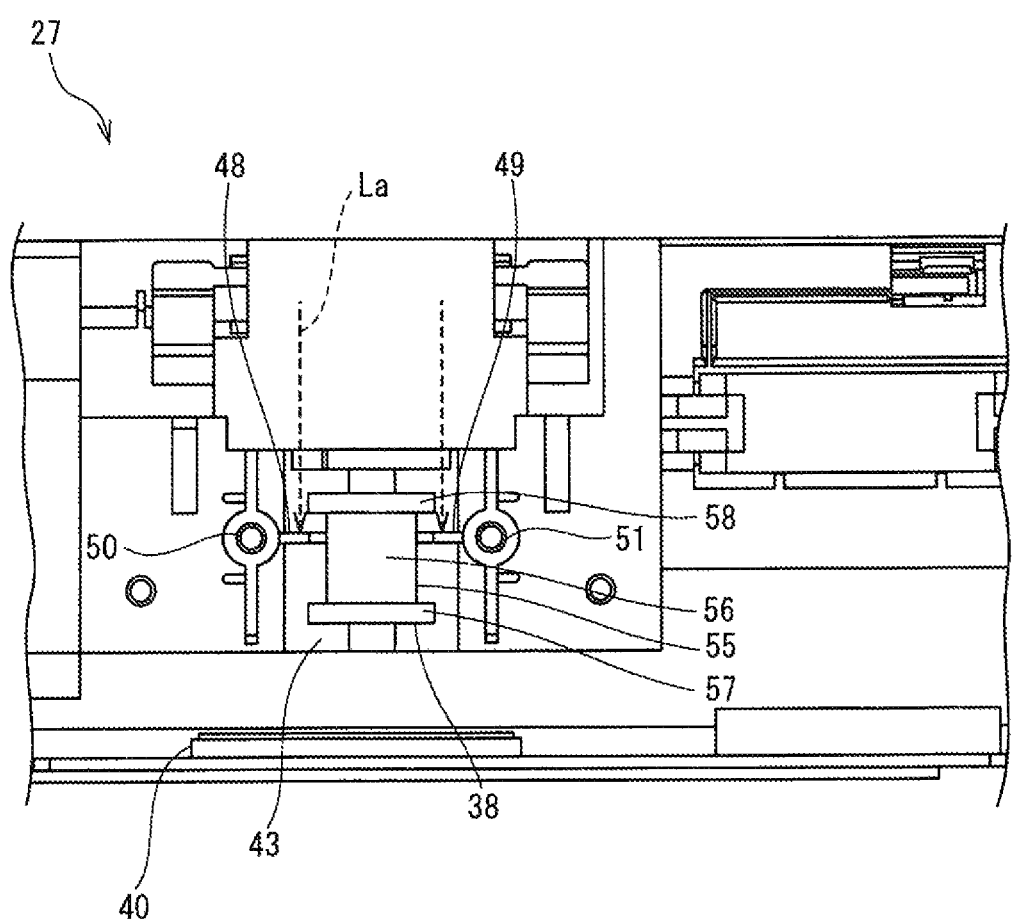
FIG. 7 is a partial plan view of the carriage in the image reading device according to the embodiment of the present disclosure.
Figure 8:
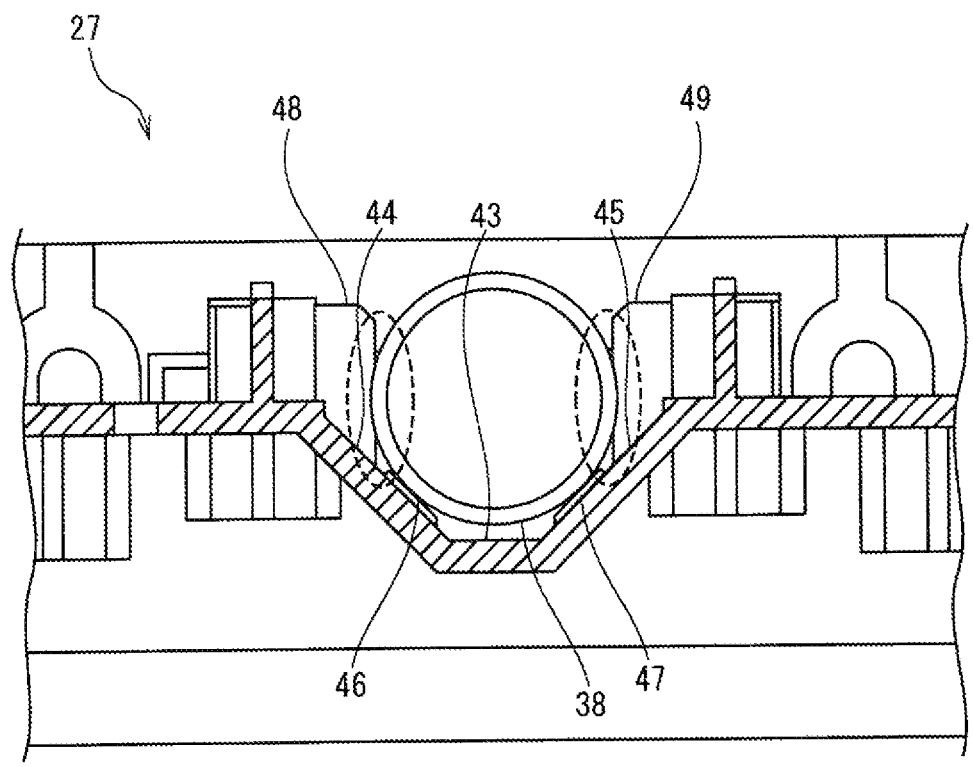
FIG. 8 is a partial sectional view of the carriage in the image reading device according to the embodiment of the present disclosure.
Figure 9:
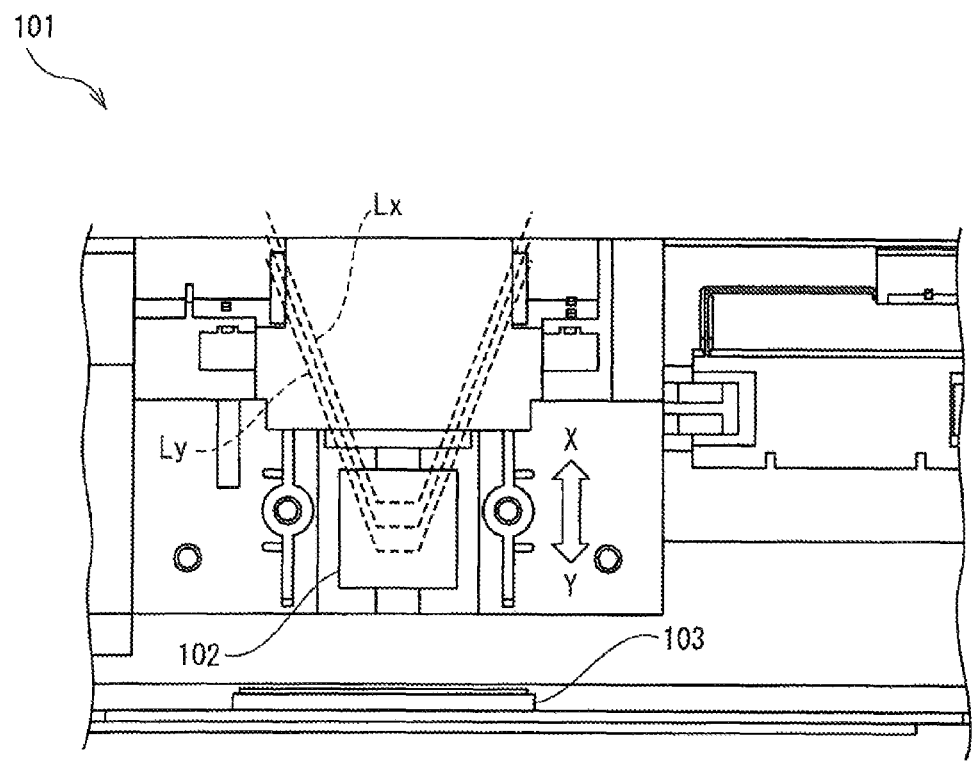
FIG. 9 is a partial plan view of a carriage in an image reading device.
Figure 10:
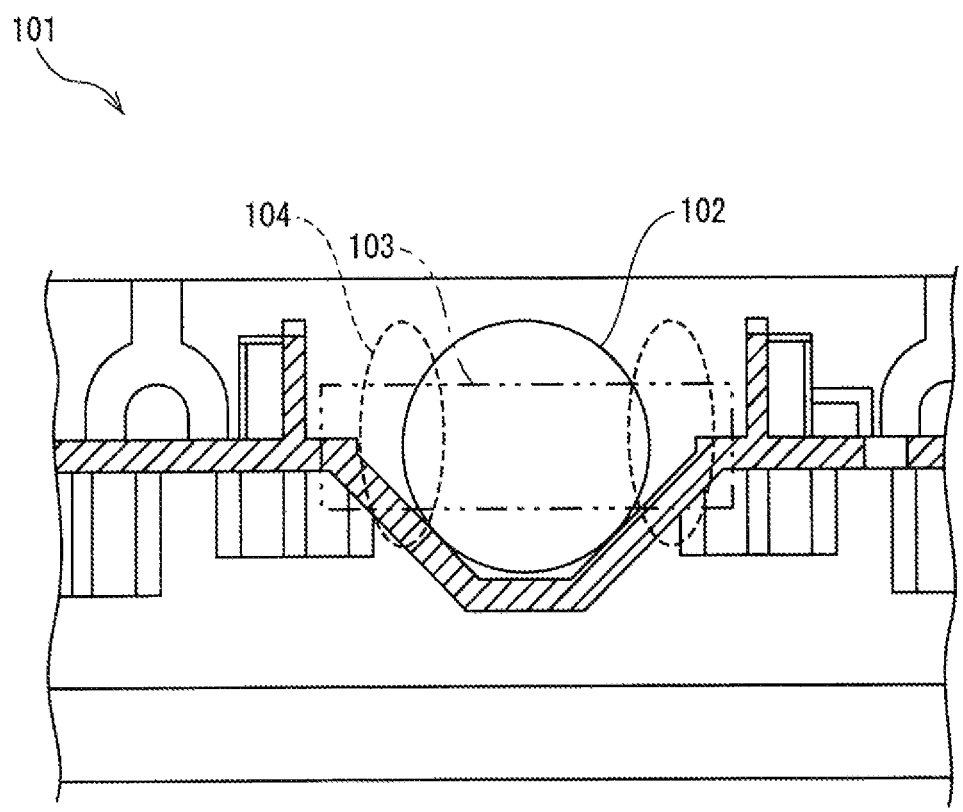
FIG. 10 is a partial sectional view of the carriage in the image reading device.
Figure 11:
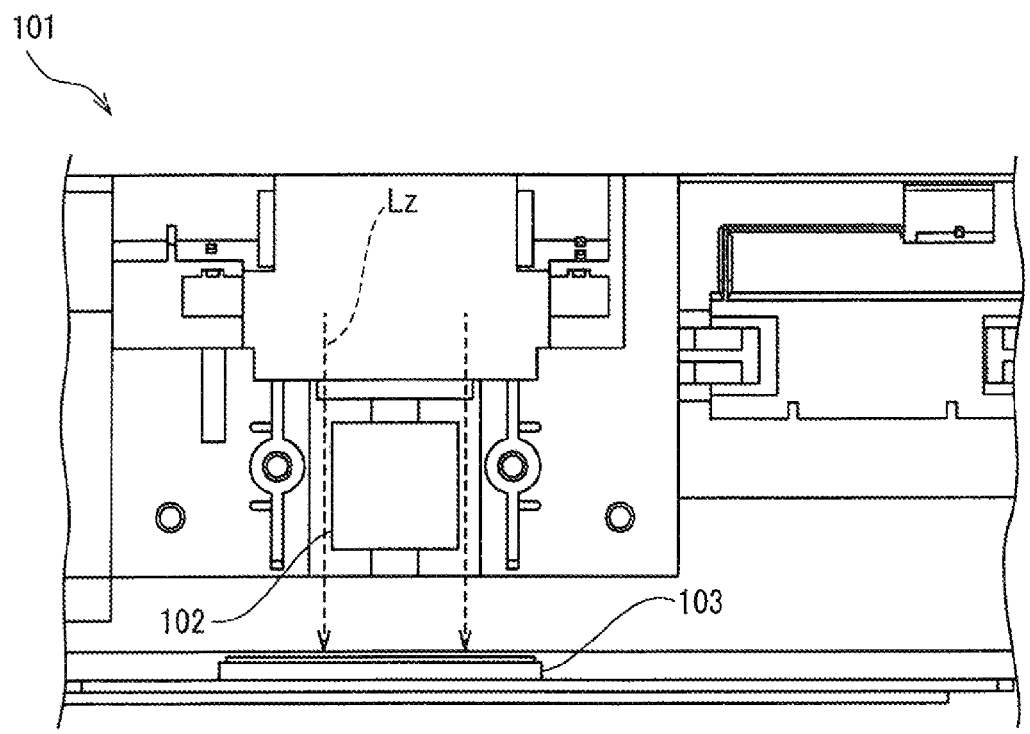
FIG. 11 is a partial plan view of the carriage in the image reading device.

Next, with reference to FIGS. 2-8, the image reading device 5 will be described. FIG. 2 is a sectional view schematically showing a structure of an image reading device according to the embodiment of the present disclosure. FIG. 3 is an enlarged view of principal parts in FIG. 2. FIG. 4 is a perspective view of the image reading device in a situation where an upper part is opened according to the embodiment of the present disclosure. FIG. 5 is a lower perspective view of the image reading device in a situation where a lower side cover of a carriage is detached according to the embodiment of the present disclosure. FIG. 6 is an enlarged view of principal parts in FIG. 5. FIG. 7 is a partial plan view of the carriage in the image reading device according to the embodiment of the present disclosure. FIG. 8 is a partial sectional view of the carriage in the image reading device according to the embodiment of the present disclosure. For convenience of explanation, FIGS. 5-7 show the carriage as viewed from below and FIG. 8 shows the carriage upside down.

The image reading device 5 includes, as shown in FIG. 2, a carriage 27 elongated in a main scanning direction A (refer to FIG. 4) and a guide rail 28 elongated in a sub scanning direction B inside a case 26. The image reading device 5 also includes a contact glass 30 and platen glass 31 in a top face of the case 26. The image reading device 5 is configured so that the carriage 27 is scanned along the guide rail 28 in the sub scanning direction B by a drive mechanism (not shown), such as a motor, and the carriage 27 reads the document on the contact glass 30 or the platen glass 31.

The carriage 27 is formed in an elongated shape in the main scanning direction A and has a housing 32. The carriage 27 is configured so that a light source 33, a plurality of reflecting mirrors 34, 35, 36 and 37, an imaging lens 38 and an imaging part 40 are attached to the housing 32.

The housing 32 has a top face having a slit 41 along the main scanning direction A and a lower part covered by a lower side cover 42.

In the lower part of the housing 32, a reception part 43 for the imaging lens 38 is provided. For example, the reception part 43 is integrated with the housing 32 and arranged near the center in the main scanning direction A and at one side (left side) in the sub scanning direction B. The reception part 43 is configured to have a concave shape in a U-shape or V-shape with a width in the main scanning direction A gradually narrowing toward a depth direction so that the concave shape is formed as a valley part continuing over the sub scanning direction B. A pair of facing surfaces 44 and 45 composing the concave shape of the reception part 43 are curved faces or inclined faces and have respective protruded parts 46 and 47 in parallel to the sub scanning direction B. The protruded parts 46 and 47 come into contact with both end parts 57 and 58 of the imaging lens 38 when the imaging lens 38 is attached to the reception part 43.

Moreover, in the lower part of the housing 32, a pair of light shielding walls 48 and 49 are vertically arranged on the reception part 43. The light shielding walls 48 and 49 are arranged at a predetermined interval across a valley portion of the reception part 43 and have light shielding surfaces facing to the sub scanning direction B so as to shield a light in the sub scanning direction B. The interval between the light shielding walls 48 and 49 is longer than a diameter of a body part 56 of the imaging lens 38 mentioned below and shorter than diameters of the both end parts 57 and 58. The light shielding walls 48 and 49 are also arranged, for example, near the center in the sub scanning direction B of the reception part 43. The light shielding walls 48 and 49 are, for example, resin molded members having thickness of 1 mm or more and may be integrated with the housing 32. It is preferable that heights of the light shielding walls 48 and 49 are higher than the imaging lens 38.

Further, in the lower part of the housing 32, threaded screw holes 50 and 51 are bored at both sides of the valley portion of the reception part 43. With the threaded screw holes 50 and 51, screws 52 and 53 are engaged to fasten a pressuring member 52, such as a plate spring. When the pressuring member 52 is placed on the imaging lens 38 attached to the reception part 43 and the threaded screw holes 50 and 51 and the screws 52 and 53 fasten the pressuring member 52, the pressuring member 52 pressures the imaging lens 38 to fix the imaging lens 38 to the reception part 43.

The light source 33 is arranged near the slit 41 in an upper part of the housing 32 to irradiate the document placed on the contact glass 30 or the platen glass 31 with the light.

The plurality of the reflecting mirrors 34, 35, 36 and 37 are arranged so as to sequentially reflect the reflected light from the document placed on the contact glass 30 or the platen glass 31, to guide the reflected light to the imaging lens 38 and to make the reflected light incident along an optical axis of the imaging lens 38. For example, the first reflecting mirror 34 is positioned below the slit 41 in the lower part of the housing 32. The second reflecting mirror 35 is positioned at another side (right side) in the sub scanning direction B in the upper part of the housing 32. The third reflecting mirror 36 is positioned at the one side in the sub scanning direction B in the upper part of the housing 32. The fourth reflecting mirror 37 is positioned at the other side in the sub scanning direction B in the lower part of the housing 32. The reflected light from the document is reflected by the first reflecting mirror 34, second reflecting mirror 35, third reflecting mirror 36 and fourth reflecting mirror 37 in turns, and then, is incident to the imaging lens 38.

The imaging lens 38 is attached to the reception part 43 to capture the reflected light from the reflected mirror 37, i.e., the reflected light from the document, onto the imaging part 40. The imaging lens 38 is configured so as to incorporate a lens 60 in a roughly cylindrical barrel 55. The barrel 55 has the body part 56 and both end parts 57 and 58. The body part 56 has a constant diameter orthogonal to the optical axis of the imaging lens 38. The both end parts 57 and 58 are arranged at both side in the optical axial direction of the body part 56 and have diameters larger than the body part 56. The body part 56 has, for example, a length of 4 mm or more. The imaging lens 38 is arranged to the reception part 43 so that the optical axis is in parallel to the sub scanning direction B and the body part 56 is put between the light shielding walls 48 and 49. The both end parts 57 and 58 work so as to stop the imaging lens 38 from coming off between the light shielding walls 48 and 49 in the sub scanning direction B. The position in the sub scanning direction B of the imaging lens 38 can be adjusted within a length of the body part 56 before the imaging lens 38 is fixed by the pressuring member 52.

As the imaging part 40, a photo detector, such as a CCD, is applied. The imaging part 40 picks up the image by photoelectrically converting the reflected light from the document captured by the imaging lens 38 to generate image data. The imaging part 40 is arranged at the other side in the sub scanning direction B in the lower part of the housing 32.

Next, the operation of forming an image by the multifunction peripheral 1 having such a configuration will be described. When the power is supplied to the multifunction peripheral 1, various parameters are initialized and initial determination, such as temperature determination of the fixing device 24, is carried out. Subsequently, in the multifunction peripheral 1, when image data is inputted and a printing start is directed from a computer or the like connected with the multifunction peripheral 1, image forming operation is carried out as follows.

First, the surface of the photosensitive drum 13 is electrically charged by the charger 14. Then, exposure corresponding to the image data is carried out on the photosensitive drum 13 by a laser (refer to an arrow P) from the exposure device 11, thereby forming an electrostatic latent image on the surface of the photosensitive drum 13. The electrostatic latent image is developed to a toner image having a correspondent color with the toner supplied from the toner container 20 in the development device 15. The toner image is first-transferred onto the surface of the intermediate transferring belt 10 in the first transferring part 16. The above-mentioned operation is repeated in order by the respective image forming parts 12, thereby forming the toner image having full color onto the intermediate transferring belt 10. Toner and electric charge remained on the photosensitive drum 13 are eliminated by the cleaning device 17 and static eliminator 18.

On the other hand, the sheet fed from the sheet feeding cartridge 3 or a manual bypass tray (not shown) by the sheet feeder 22 is conveyed to the second transferring part 23 in a suitable timing for the above-mentioned image forming operation. Then, in the second transferring part 23, the toner image having full color on the intermediate transferring belt 10 is second-transferred onto the sheet. The sheet with the second-transferred toner image is conveyed to a downstream on the conveying path 21 to enter the fixing device 24, and then, the toner image is fixed on the sheet in the fixing device 24. The sheet with the fixed toner image is ejected from the ejection opening 25 onto the ejected sheet tray 4.

Next, the operation of reading the image in the image reading device 5 having such a configuration will be described.

In a case of reading the document placed on the feeding sheet tray 7, the document feeding device 6 feeds this document to the platen glass 31. Moreover, the light source 33 of the carriage 27 irradiates the document passing on the platen glass 31 with the light. On the other hand, in another case of reading the document placed on the contact glass 30, the carriage 27 is moved on the guide rail 28, and simultaneously, the light source 33 irradiates the document on the contact glass 30 with the light.

In either case mentioned above, the light La reflected by the document in accordance with the irradiated light of the light source 33 is incident into the housing 32 via the slit 41 of the carriage 27.

Subsequently, this reflected light is reflected by the first reflecting mirror 34, second reflecting mirror 35, third reflecting mirror 36 and fourth reflecting mirror 37 in turns, and then, the reflected light from the fourth reflecting mirror 37 is incident to the imaging lens 38 along the optical axial direction of the imaging lens 38.

At this time, since the body part 56 of the imaging lens 38 is arranged to the reception part 43 between the light shielding walls 48 and 49 so that the both end parts 57 and 58 are overlapped with the light shielding walls 48 and 49 as viewed in the optical axial direction, the optical path run from the fourth reflecting mirror 37 to the imaging part 40 in the periphery of the imaging lens 38 is closed by the both end parts 57 and 58 of the imaging lens 38 and the light shielding walls 48 and 49 of the housing 32. That is, an unnecessary light (a flare light) run to the imaging part 40 without passing through the imaging lens 38 is shielded.

On the other hand, the reflected light from the document being incident to the imaging lens 38 is captured onto the imaging part 40 by the imaging lens 38. The imaging part 40 picks up the image in accordance with the reflected light from the document captured by the imaging lens 38 to generate the image data and to transmit the image data, for example, to a controlling part or image processing part (both not shown) in the image reading part 5.

According to the present embodiment, as described above, the barrel 55 of the imaging lens 38 includes the body part 56 having the constant diameter and the both end parts 57 and 58 arranged at both ends in the optical axial direction having the diameters larger than the body part 56. The reception part 43 of the imaging lens 38 in the housing 32 includes the light shielding walls 48 and 49 having a space with the interval larger than the diameter of the body part 56 and smaller than the diameters of the both end parts 57 and 58 and shielding the light in the optical axial direction. Thereby, even if the imaging lens 38 is moved in any position in the optical axial direction in order to adjust magnification, it is possible to securely close the optical path run to the imaging part 40 in the periphery of the imaging lens 38 by the both end parts 57 and 58 and the light shielding walls 48 and 49 to securely shield the unnecessary light run to the imaging part 40 not passing through the imaging lens 38 is shielded. In particular, although an unnecessary light being incident near the center in upward and downward directions of the imaging part 40 may cause great malfunction onto the read image, the both end parts 57 and and the light shielding walls 48 and 49 in the embodiment can securely shield such a unnecessary light near the center in the upward and downward directions of the imaging lens 38. Therefore, since any unnecessary light cannot be incident to the imaging part 40, it is possible to obtain high quality read image by a configuration without complication.

In the embodiment, by determining the length in the optical axial direction of the body part 56 to 4 mm or more, it is possible to adjust the position of the imaging lens 38 within a range from −1.5 mm to +1.5 mm in order to the adjust the magnification of the imaging lens 38. Moreover, by determining the thickness of the light shielding walls 48 and 49 to 1 mm or more, it is possible to secure sufficient strength.

In the embodiment, since the reception part 43 of the imaging lens 38 is configured to have the concave shape with the width gradually narrowing toward the depth direction so that the concave shape continues over the optical axial direction of the imaging lens 38, it is possible to stably support the roughly semicircular barrel 55 of the imaging lens 38. Since the both end parts 57 and 58 with the diameters lather than the body part 56 in the imaging lens 38 always comes into contact with the protruded parts 46 and 47 of the reception part 43, it is possible to stably support the imaging lens 38. In addition, since the body part 56 has a constant diameter, it is possible to pressure and fix the body part 56 by constant force if the imaging lens 38 is moved to any position in the optical axial direction in order to adjust the magnification.

Although, in the embodiment, a configuration of the image reading device 5 incorporating the light source 33, the plurality of the reflecting mirrors 34, 35, 36 and 37, imaging lens 38 and imaging part 40 into the carriage 27 in a body was described, the image reading device 5 is not restricted by this configuration. For example, in another embodiment, the image reading device 5 may be configured so that the imaging lens 38 and imaging part 40 is fixed to a base part of the case 26, the light source 33 and the plurality of the reflecting mirrors 34, 35, 36 and 37 are divided and installed to two carriages and the two carriage are scanned.

Although, in the embodiment, a configuration of including four reflecting mirrors 34, 35, 36 and 37 was described, the reflecting mirrors are not restricted by this configuration. The reflecting mirrors may be configured so that the reflected light from the document is incident along the optical axis of the imaging lens 38.

The embodiment was described in a case of applying the configuration of the present disclosure to the multifunction peripheral 1. On the other hand, in another embodiment, the configuration of the disclosure may be applied to another image reading device, such as a scanner, copying machine or a facsimile.

While the present disclosure has been described with reference to the particular illustrative embodiments, it is not to be restricted by the embodiments. It is to be appreciated that those skilled in the art can change or modify the embodiments without departing from the scope and spirit of the present disclosure.

What is claimed is:

1. An image reading device comprising:
    an imaging lens including a body part having a constant diameter and both end parts arranged at both ends in an optical axial direction having diameters larger than the body part to capture a reflected light from a document onto an imaging part; and
    light shielding walls arranged at a predetermined interval, the predetermined interval being larger than the diameter of the body part and smaller than the diameters of the both end parts, so that the body part of the imaging lens is arranged in the predetermined interval, and the light shielding walls shielding a light in the optical axial direction, wherein only the both end parts of the imaging lens are supported by a reception part formed in a concave shape continuing over the optical axial direction, the reception part has a protruded part in parallel to the optical axial direction, and the imaging lens comes into contact with only the protruded part when being arranged to the reception part.

2. The image reading device according to claim 1, wherein the body part has a length in the optical axial direction of 4 mm or more.

3. The image reading device according to claim 1, wherein the light shielding walls are vertically arranged in the reception part so as to be higher than the imaging lens.

4. The image reading device according to claim 1, further comprising:

a pressuring member, wherein the imaging lens is fixed to the reception part by pressure of the pressuring member.

5. The image reading device according to claim 1, further comprising:

a carriage elongated in a main scanning direction, wherein the reception part is integrated with a housing of the carriage and arranged at the center in the main scanning direction.

6. A housing of a carriage comprising:

light shielding walls arranged at a predetermined interval, the predetermined interval being larger than a diameter of a body part of a predetermined imaging lens and smaller than diameters of both end parts arranged at both ends in an optical axial direction of the imaging lens, so that the body part of the imaging lens is arranged in the predetermined interval, and the light shielding walls shielding a light in the optical axial direction; and a reception part formed in a concave shape continuing over the optical axial direction to support only the both end parts of the imaging lens, wherein the reception part has a protruded part in parallel to the optical axial direction, and the imaging lens comes into contact with only the protruded part when being arranged to the reception part.

7. A carriage comprising:

an imaging lens including a body part having a constant diameter and both end parts arranged at both ends in an optical axial direction having diameters larger than the body part to capture a reflected light from a document onto an imaging part; and light shielding walls arranged at a predetermined interval, the predetermined interval being larger than the diameter of the body part and smaller than the diameters of the both end parts, so that the body part of the imaging lens is arranged in the predetermined interval, and the light shielding walls shielding a light in the optical axial direction, wherein only the both end parts of the imaging lens are supported by a reception part formed in a concave shape continuing over the optical axial direction, the reception part has a protruded part in parallel to the optical axial direction, and the imaging lens comes into contact with only the protruded part when being arranged to the reception part.

* * * * *